(12) United States Patent
Kim et al.

(10) Patent No.: US 7,659,959 B2
(45) Date of Patent: Feb. 9, 2010

(54) ARRAY SUBSTRATE FOR IN-PLANE SWITCHING LIQUID CRYSTAL DISPLAY DEVICE HAVING IMPROVED BRIGHTNESS AND MANUFACTURING METHOD OF THE SAME

(75) Inventors: Kwang-Min Kim, Daejeon (KR); June-Hee Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 671 days.

(21) Appl. No.: 11/387,710

(22) Filed: Mar. 24, 2006

(65) Prior Publication Data

US 2006/0232537 A1    Oct. 19, 2006

(30) Foreign Application Priority Data

Mar. 25, 2005    (KR) .................... 10-2005-0024927

(51) Int. Cl.
*G02F 1/1343* (2006.01)

(52) U.S. Cl. .................... 349/141; 349/143; 349/144
(58) Field of Classification Search ................ 349/141, 349/143, 144
See application file for complete search history.

(56) References Cited

U.S. PATENT DOCUMENTS

| 6,356,331 | B1 * | 3/2002 | Ono et al. .................... 349/141 |
| 6,483,566 | B2 * | 11/2002 | Youn et al. .................... 349/141 |
| 6,747,722 | B2 * | 6/2004 | Ono et al. .................... 349/141 |

* cited by examiner

*Primary Examiner*—Mike Qi
(74) *Attorney, Agent, or Firm*—Holland & Knight LLP

(57) ABSTRACT

An array substrate for an in-plane switching liquid crystal display device includes a substrate, a gate line and a data line on the substrate and crossing each other to define a pixel region, a thin film transistor adjacent to a crossing of the gate line and the data line, a common electrode and a pixel electrode in the pixel region and spaced apart from each other, and a conductive pattern between the common and pixel electrodes.

19 Claims, 10 Drawing Sheets

ARRAY SUBSTRATE FOR IN-PLANE SWITCHING LIQUID CRYSTAL DISPLAY DEVICE HAVING IMPROVED BRIGHTNESS AND MANUFACTURING METHOD OF THE SAME

The present invention claims the benefit of Korean Patent Application No. 2005-0024927 filed on Mar. 25, 2005, which is hereby incorporated in its entirety.

BACKGROUND OF THE INVENTION

1. Field of the Invention

The present invention relates to a liquid crystal display (LCD) device. More particularly, the present invention relates to an in-plane switching liquid crystal display (IPS-LCD) device and a manufacturing method of the same.

2. Discussion of the Related Art

Liquid crystal display (LCD) devices use the optical anisotropy and polarization properties of liquid crystal molecules to produce an image. Liquid crystal molecules have an alignment direction as a result of their long thin shapes and can be arranged to have initial pretilt angles. The alignment direction can be controlled or augmented by applying an electric field. More specifically, the intensity of an applied electric field varies the alignment of the liquid crystal molecules. Due to the optical anisotropy of liquid crystal molecules, the refraction of incident light depends on the alignment direction of the liquid crystal molecules. Thus, by controlling the applied electric field, an image that has a desired brightness can be produced. Among the different types of known liquid crystal displays (LCDs), active matrix LCDs (AM-LCDs), which have thin film transistors (TFTs) and pixel electrodes arranged in a matrix form, are the subject of significant research and development because of their high resolution and capability to display moving images.

In general, a liquid crystal display (LCD) device includes two substrates, which are spaced apart and face each other, and a liquid crystal layer interposed between the two substrates. Each of the substrates includes an electrode, and the electrodes of each substrate also face each other. A voltage is applied between the electrodes such that an electric field is induced between the electrodes. The alignment direction of the liquid crystal molecules between the electrodes is changed by varying the intensity of the electric field. Since the electrodes are positioned on the two substrates, respectively, the electric field induced between the electrodes is perpendicular to the lower and upper substrates. Accordingly, the related art LCD devices have a narrow viewing angle because of the longitudinal electric field control of the liquid crystal molecules. To solve the problem of narrow viewing angle, in-plane switching liquid crystal display (IPS-LCD) devices have been developed. An IPS-LCD device includes a pixel electrode and a common electrode on the same substrate.

FIG. 1 is a cross-sectional view illustrating an in-plane switching liquid crystal display (IPS-LCD) device according to the related art. As shown in FIG. 1, the IPS-LCD device includes an array substrate and a color filter substrate with a liquid crystal layer LC interposed therebetween. A pixel region P is defined on a first substrate 50. A thin film transistor T is formed within the pixel region P on the first substrate 50. The thin film transistor T includes a gate electrode 52, a semiconductor layer 62, a source electrode 64, and a drain electrode 66. Further, a common electrode 58 and a pixel electrode 72 are also formed within the pixel region P. The common electrode 58 and the pixel electrode 72 are spaced apart from each other on the same substrate.

The common electrode 58 is formed of the same material and in the same layer as the gate electrode 52, and the pixel electrode 72 can be formed of the same material and in the same layer as the source and drain electrodes 64 and 66. The pixel electrode 72 can be formed of a transparent conductive material to improve the aperture ratio. Although not shown in FIG. 1, a gate line is formed along a side of the pixel region P and a data line is formed along a direction perpendicular to the gate line. A common line may be formed parallel to the gate line, and the common line provides voltages to the common electrode 58.

A second substrate 30 is spaced apart from the first substrate 50. A black matrix 32 is formed on an inner surface of the second substrate 30, i.e., a surface facing the first substrate 50. The black matrix 32 corresponds to the gate line (not shown), the data line (not shown) and the thin film transistor T. A color filter layer is also formed on the inner surface of the second substrate 30, and the color filter layer includes three color filters of red 34a, green 34b, and blue (not shown). The color filter layer corresponds to the pixel region P.

A liquid crystal layer LC is interposed between the first substrate 50 and the second substrate 30. Liquid crystal molecules of the liquid crystal layer LC are oriented in response to a horizontal electric field 95 induced between the common electrode 58 and the pixel electrode 72. Light transmission through the liquid crystal layer LC depends upon the orientation of the liquid crystal molecules.

FIG. 2 is a plan view illustrating one sub-pixel of an array substrate for an IPS-LCD device according to the related art. As shown in FIG. 2, a gate line 54 is formed on a substrate 50 along a first direction. A data line 68 is formed on the substrate 50 along a second direction perpendicular to the first direction. The gate line 54 and the data line 68 cross each other to define a pixel region P. A common line 56 is spaced apart from and parallel to the gate line 54. A thin film transistor T is formed adjacent to a crossing of the gate line 54 and the data line 68. The thin film transistor T includes a gate electrode 52, a semiconductor layer 62, a source electrode 64, and a drain electrode 66.

A pixel electrode 72 is formed in the pixel region P and is connected to the drain electrode 66. The pixel electrode 72 includes finger portions parallel to the data line 68. A common electrode 58 is also formed in the pixel region P and is connected to the common line 56. The common electrode 58 includes finger portions parallel to the data line 68 and spaced apart from each other. The portions of the common electrode 58 are interleaved with the portions of the pixel electrode 72. Both the common electrode 58 and the pixel electrode 72 are formed of a transparent conductive material. Even though the common electrode 58 and the pixel electrode 72 are transparent, the light transmittance is not remarkably increased as compared to common and pixel electrodes formed of an opaque conductive material.

FIG. 3 is a cross-sectional view along the line III-III of FIG. 2 together with a transmittance curve F corresponding to the electrodes. As shown in FIG. 3, a gate insulating layer GL is formed on a substrate 50, where a pixel region P is defined, and a data line 68 is formed on the gate insulating layer GL at a side of the pixel region P. A passivation layer PL is formed on the data line 68. A common electrode 58 and a pixel electrode 72 are formed on the passivation layer PL in the pixel region P. The common electrode 58 and the pixel electrode 72 are spaced apart from each other and interleaved with each other. The common electrode 58 and the pixel electrode 72 are formed of a transparent conductive material.

When a voltage is applied to the common electrode 58 and the pixel electrode 72, an electric field 95 is induced between the common electrode 58 and the pixel electrode 72. The electric field 95 only spreads several micrometers into the electrodes from edges of the electrodes. That is, since the electric field 95 does not significantly occur or is not present at central portions of the common electrode 58 and the pixel electrode 72, liquid crystal molecules (not shown) over the central portions of the common electrode 58 and the pixel electrode 72 are not affected by an electric field 95.

As shown in FIG. 3, just small areas K along both sides of each of the common electrode 58 and the pixel electrode 72 are influenced by the electric field 95. The intensity of the electric field 95 in the areas K is much weaker than that in the region between the common electrode 58 and the pixel electrode 72. Accordingly, the light transmittance in the areas K goes down rapidly as compared with the region between the common electrode 58 and the pixel electrode 72. Although the common and pixel electrodes 58 and 72 are transparent, there is little improvement in the brightness of the display because the liquid crystal directly over the common electrode 58 and the pixel electrode 72 is not actuated because of the lack of an electric field.

SUMMARY OF THE INVENTION

Accordingly, the present invention is directed to an array substrate for an in-plane switching liquid crystal display device and a manufacturing method of the same that substantially obviate one or more problems due to limitations and disadvantages of the related art.

An advantage of the present invention is to provide an array substrate for an in-plane switching liquid crystal display device and a manufacturing method of the same having improved brightness.

Another advantage of the present invention is to provide an array substrate for an in-plane switching liquid crystal display device and a manufacturing method of the same having improved viewing angle properties.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described, an array substrate for an in-plane switching liquid crystal display device includes a substrate, a gate line and a data line on the substrate and crossing each other to define a pixel region, a thin film transistor adjacent to a crossing of the gate line and the data line, a common electrode and a pixel electrode in the pixel region and spaced apart from each other, and a conductive pattern between the common and pixel electrodes.

In another aspect of the present invention, a manufacturing method of an array substrate for an in-plane switching liquid crystal display device includes forming a gate line and a data line on a substrate, the gate line and the data line crossing each other to define a pixel region, forming a thin film transistor adjacent to a crossing of a gate line and a data line, forming a common electrode and a pixel electrode in the pixel region, the common and pixel electrodes spaced apart from each other, and forming a conductive pattern between the common and pixel electrodes.

In another aspect of the present invention, an array substrate for an in-plane switching liquid crystal display device includes a substrate, a gate line and a data line on the substrate and crossing each other to define a pixel region, a thin film transistor adjacent to a crossing of the gate line and the data line, a common line having a first plate at substantially a center of the pixel region, a pixel electrode having a second plate, which overlaps the first plate of the common line and an insulating film to form a storage capacitor, at least first and second pixel electrode portions extending from the second plate of the pixel electrode, vertical parts connected to the common line and overlapping data lines on both sides of the pixel region, a first conductive pattern between the first pixel electrode portion and one of the vertical parts, and a second conductive pattern between the second pixel electrode portion and another of the vertical parts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, an example of which is illustrated in the accompanying drawings.

Figure 1:
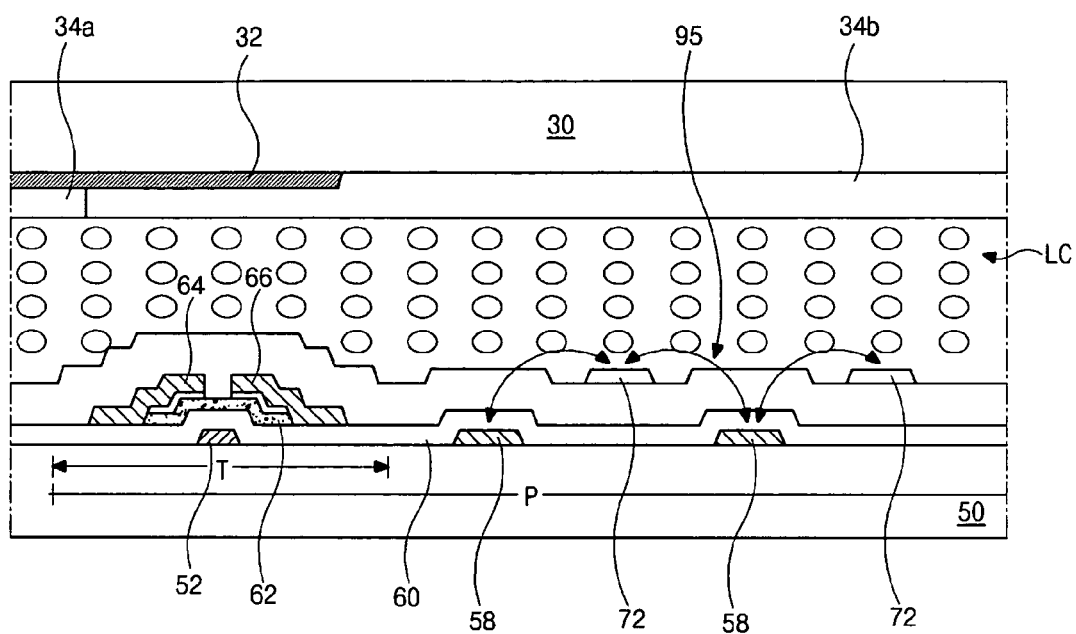
FIG. 1 is a cross-sectional view illustrating an in-plane switching liquid crystal display (IPS-LCD) device according to the related art.
Figure 2:
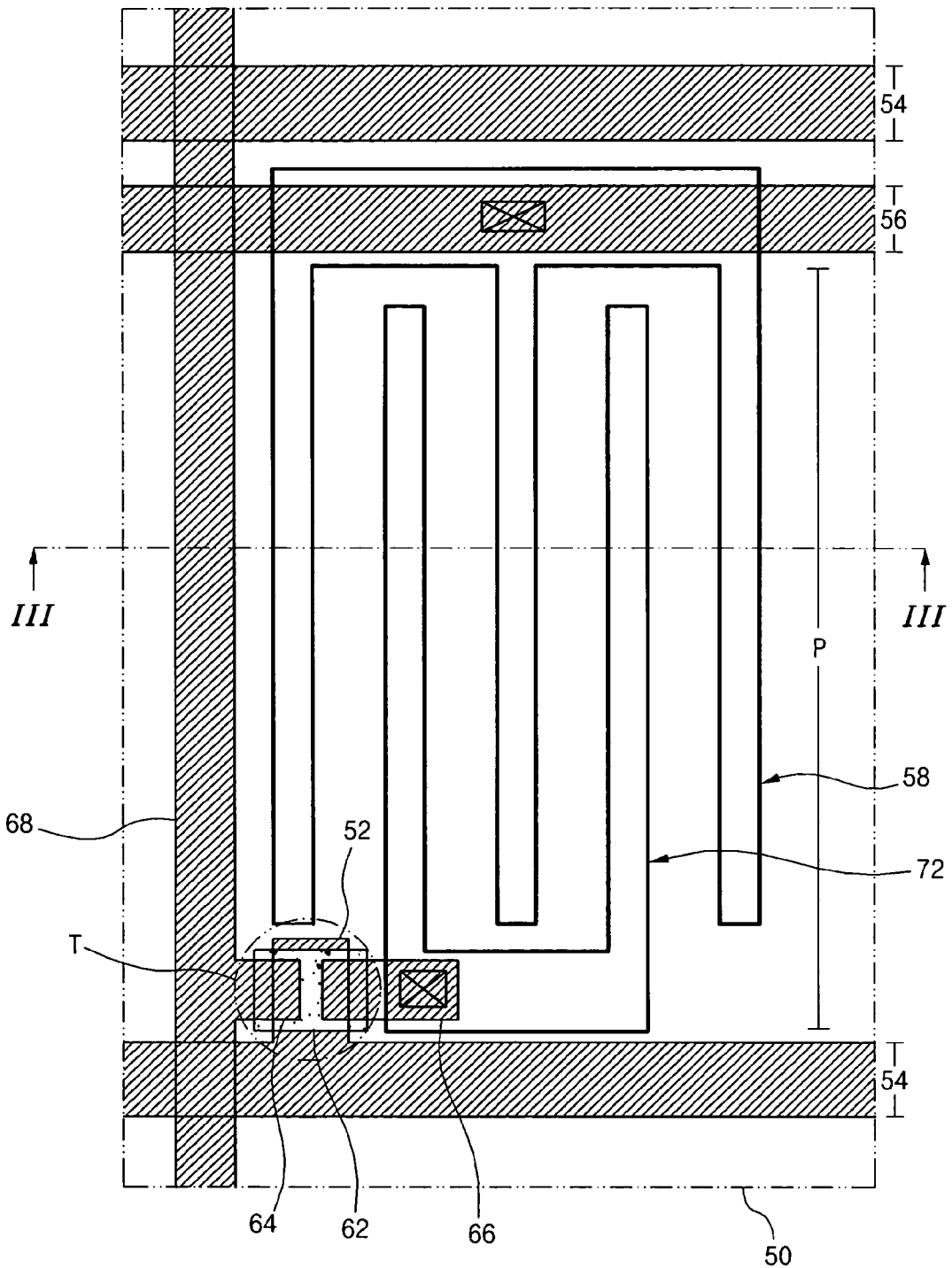
FIG. 2 is a plan view illustrating one sub-pixel of an array substrate for an IPS-LCD device according to the related art.
Figure 3:
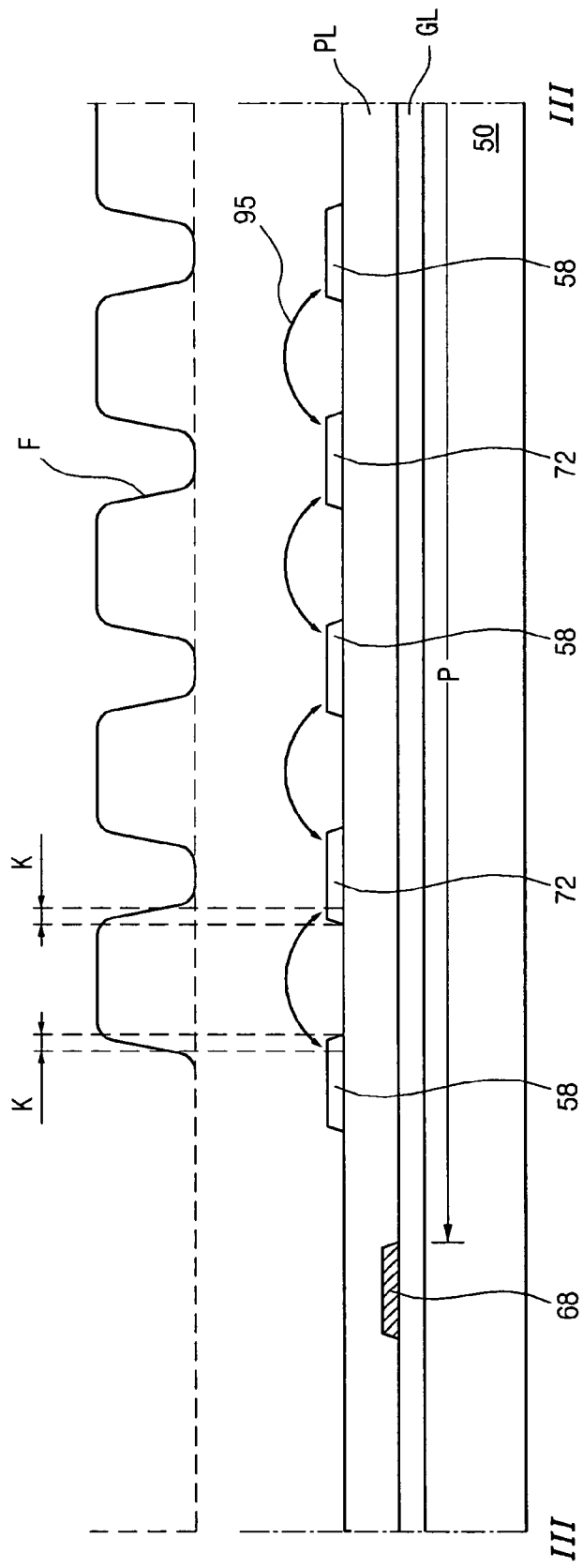
FIG. 3 is a cross-sectional view along the line III-III of FIG. 2 together with a transmittance curve F corresponding to the electrodes.
Figure 4:
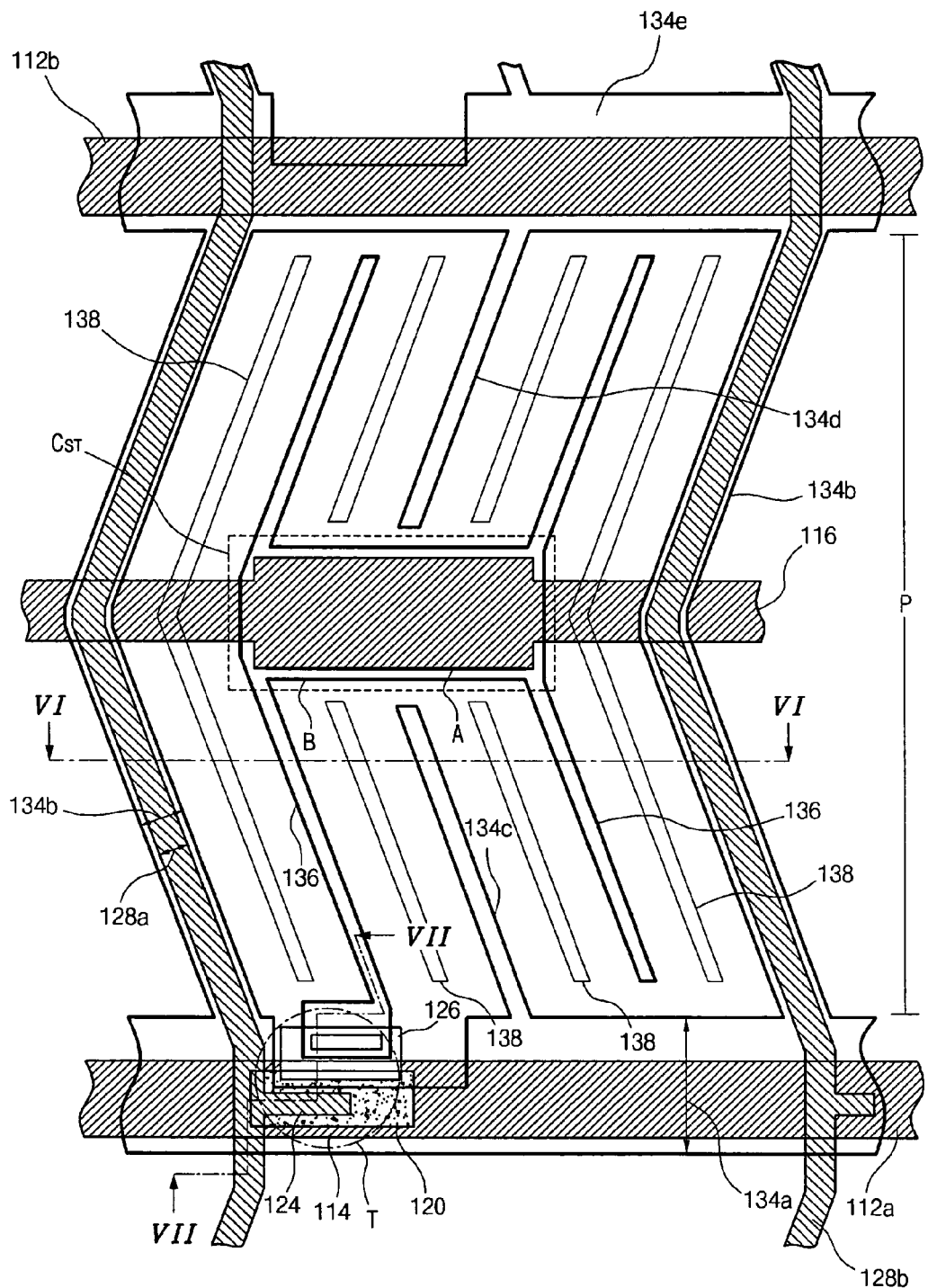
FIG. 4 is a plan view illustrating one sub-pixel of an array substrate for an IPS-LCD device according to an embodiment of the present invention.

FIG. 4 is a plan view illustrating one sub-pixel of an array substrate for an IPS-LCD device according to an embodiment of the present invention. As shown in FIG. 4, a gate line 112a is formed on a substrate along a first direction, and a data line 128a is formed along a second direction perpendicular to the first direction. The gate line 112a and the data line 128a cross each other to define a pixel region P. A common line 116 is formed across the pixel region P and is spaced apart from and parallel to the gate line 112a. The common line 116 includes a plate A at the center of the pixel region P. The plate A of the common line 116 has a width wider than other parts of the common line 116. The data line 128a bends where the data line 128a overlaps the common line 116 and is substantially symmetric about the common line 116.

A thin film transistor T is formed adjacent to the crossing of the gate line 112a and the data line 128a. The thin film transistor T includes a gate electrode 114, a semiconductor layer 120, a source electrode 124, and a drain electrode 126.

A pixel electrode 136 and a common electrode 134 are formed in the pixel region P. The common electrode 134 includes a first horizontal part 134a, first vertical parts 134b, a second vertical part 134c, a third vertical part 134d, and a second horizontal part 134e. The first horizontal part 134a overlaps the gate line 112a. The second horizontal part 134e is spaced apart from and parallel to the first horizontal part 134a. As shown in FIG. 4, the second horizontal part 134e can overlap another gate line 112b. The first vertical parts 134b are parallel to and overlap the data line 128a and another data line 128b. The first vertical parts 134b are connected to the first horizontal part 134a and the second horizontal part 134e so as to surround the pixel region P. The second vertical part 134c extends from the first horizontal part 134a in the pixel region P, and the third vertical part 134d extends from the second horizontal part 134e in the pixel region P. The second vertical part 134c and the third vertical part 134d are parallel to and spaced apart from opposing portions of the first vertical parts 134b. The second vertical part 134c and the third vertical part 134d are on opposite sides of the common line 116 and substantially equidistant from the plate A of the common line 116.

The pixel electrode 136 includes a plate B with four vertical pixel electrode portions extending from the plate B of the pixel electrode. The plate B of the pixel electrode 136 overlaps the plate A of the common line 116 with an insulating layer interposed between the plates A and B to form a storage capacitor $C_{ST}$. Vertical pixel electrode portions of the pixel electrode 136 extend from the plate B of the pixel electrode in both upward and downward directions within the pixel region P in the context of the FIG. 4 and are parallel to the first vertical parts 134b of the common electrode 134. The vertical pixel electrode portions of the pixel electrode 136 are interleaved between the first vertical parts 134b of the common electrode, and the second and third vertical parts 134c and 134d of the common electrode 134. Each of the pixel electrode vertical portions of the pixel electrode 136 extends from the plate B of the pixel electrode 136. One of the vertical portions of the pixel electrode 136 is connected to the thin film transistor T.

Conductive patterns 138 are disposed between adjacent common and pixel electrodes. That is, the conductive patterns 138 are disposed between the first vertical part 134b and a vertical pixel electrode portion of the pixel electrode 136, between a vertical pixel electrode portion of the pixel electrode 136 and the second vertical part 134c, and between a vertical pixel electrode portion of the pixel electrode 136 and the third vertical part 134d, respectively. The conductive patterns 138 can be in an electrically floating state. Further, the conductive patterns 138 can be electrically disconnected from one another. The conductive patterns 138 are respectively parallel to an adjacent vertical part of the pixel electrode. Thus, the data line 128a, the first vertical parts 134b of the common electrode, the vertical pixel electrode portions of the pixel electrode 136, and the conductive patterns 138 form a sideways V-shape with respect to the gate line 112a.

In embodiments of the present invention, an electric field induced between the pixel electrode 136 and the common electrode 134 extends beyond sides of the pixel electrode 136 and the interior common electrodes 134c and 134d so as to be more over the top of the pixel electrode 136 and the interior common electrodes 134c and 134d due to the conductive patterns 138. Thus, light is transmitted through the pixel electrode 136 and the interior common electrodes 134c and 134d since liquid crystal molecules above the pixel electrode 136 and the interior common electrodes 134c and 134d are actuated. Accordingly, a light transmission area is increased so as to improve the aperture ratio, which improves brightness.

Figure 5A:
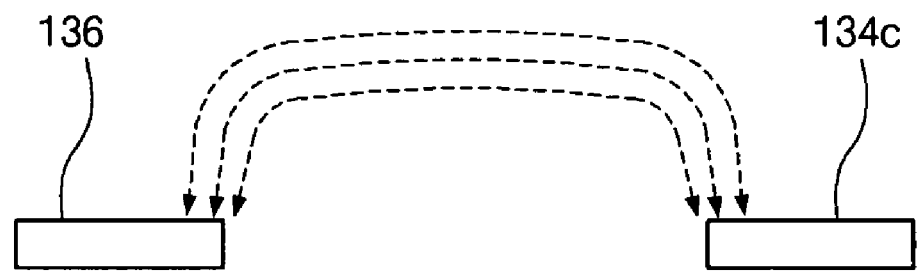
FIG. 5A and FIG. 5B are views illustrating differences in electric field density due the use of a conductive pattern between pixel and common electrodes.
Figure 5B:
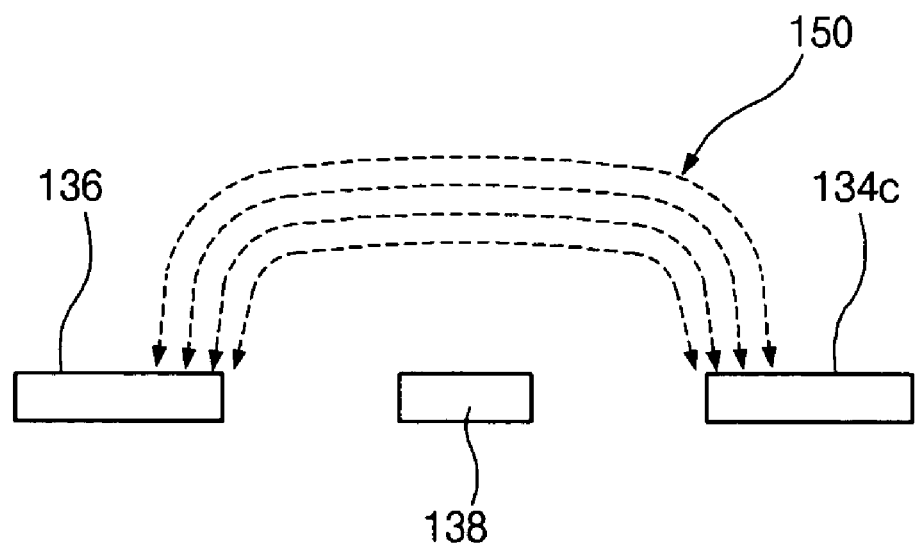

FIG. 5A and FIG. 5B are views illustrating differences in electric field distribution due the use of a conductive pattern between pixel and common electrodes. FIG. 5A shows an electric field distribution when there is no conductive pattern between interior common electrodes 134c and 134d, and the pixel electrode 136. FIG. 5B shows an electric field distribution when there is a conductive pattern between a common electrode 134c and a pixel electrode 136. As shown in FIGS. 5A and 5B, the electric field 150 of FIG. 5B is distributed across larger areas of both the common electrode 134c and the pixel electrode 136 due to the conductive pattern 138 as compared the electric field distribution shown in FIG. 5A.

This increased electric field intensity over the common and pixel electrodes can be obtained by the relation between an electric field intensity and an electric flux density as follows.

The electric field intensity E is given by $$E=\{Q/(4\pi\epsilon_0 r^2)\}a_r, \qquad (1)$$

and the electric flux density D is given by $$D=\{Q/4\pi r^2\}a_r, \qquad (2)$$

where Q is an electric charge, r is a separation distance between the electric charge and a test charge, $a_r$ is a unit vector representing the direction of a force that is given to the test charge, and $\epsilon_0$, the permittivity of free space. From the equations (1) and (2), the relation between the electric field intensity E and the electric flux density D is represented by $$D=\epsilon_0 E. \qquad (3)$$

Here, the conductive pattern 138 reduces the distance r. Thus, The electric flux density D and the electric field intensity E are increased. Accordingly, liquid crystal molecules over the pixel electrode 136 and the common electrode 134c can be driven or actuated, and the brightness is improved. The size of the area over the electrodes for driving the liquid crystal molecules may be increased by controlling the size of the conductive pattern 138.

Figure 6:
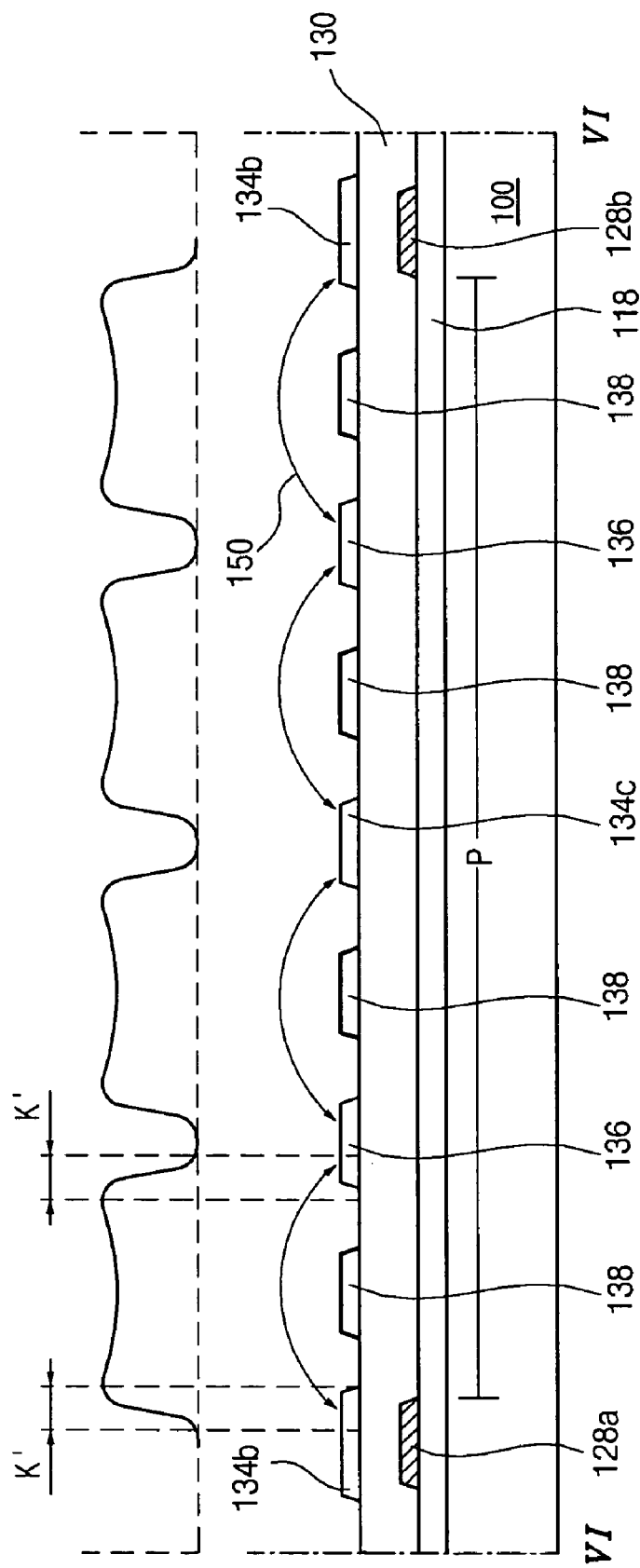
FIG. 6 is a cross-sectional view along the line VI-VI of FIG. 4 together with a transmittance curve F corresponding to a pixel electrode, a common electrode, and a conductive pattern between the pixel and common electrodes.

FIG. 6 is a cross-sectional view along the line VI-VI of FIG. 4 and together with a transmittance curve F corresponding to a pixel electrode, a common electrode, and a conductive pattern between the pixel and common electrodes. As shown in FIG. 6, a gate insulating layer 118 is formed on a substrate 100 where a pixel region P is defined. Data lines 128a and 128b are formed on the gate insulating layer 118 on both sides of the pixel region P. A passivation layer 130 is formed on the data lines 128a and 128b. A common electrode and a pixel electrode 136 are formed on the passivation layer 130 in the pixel region P. The common electrode includes first and second vertical parts 134b and 134c. The first and second vertical parts 134b and 134c of the common electrode and the pixel electrode 136 are spaced apart from each and alternate with each other. A conductive pattern 138 is disposed between adjacent common electrodes 134 and pixel electrodes 136, that is, between the first vertical part 134b and the pixel electrode 136 and between the pixel electrode 136 and the second vertical part 134c. The conductive pattern 138 is electrically isolated from the common electrode 134 and from the pixel electrode 136. The common electrode, the pixel electrode 136, and the conductive pattern 138 are formed of a transparent conductive material.

When a voltage is applied to the common electrode and the pixel electrode 136, an electric field 150 is induced between the common electrode and the pixel electrode 136. As shown in FIG. 6, the transmittance is high between the conductive pattern 138 and the common electrode and between the conductive pattern 138 and the pixel electrode 136. More particularly, as mentioned above, the electric flux density between the common electrode and the pixel electrode 136 is increased due to the conductive pattern 138 such that the electric field intensity is increased across areas K', which are larger than in the related art, along both sides of each the common electrode 134 and the pixel electrode 136. Therefore, liquid crystal molecules in the areas K' rotate, and thus the transmittance is increased.

FIGS. 7A and 7B, FIGS. 8A and 8B, FIGS. 9A and 9B, and FIGS. 10A and 10B are cross-sectional views illustrating a manufacturing method of an array substrate for an IPS-LCD device according to embodiments of the present invention. FIGS. 7A, 8A, 9A, and 10A correspond to the line VII-VII of FIG. 4. FIGS. 7B, 8B, 9B, and 10B correspond to the line V-V of FIG. 4.

Figure 7A:
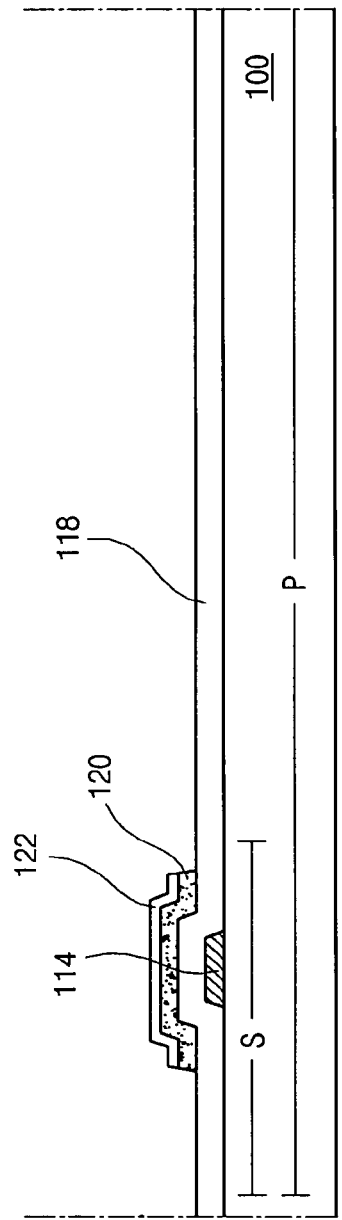
FIGS. 7A and 7B, FIGS. 8A and 8B, FIGS. 9A and 9B, and FIGS. 10A and 10B are cross-sectional views illustrating a manufacturing method of an array substrate for an IPS-LCD device according to an embodiment of the present invention.
Figure 7B:
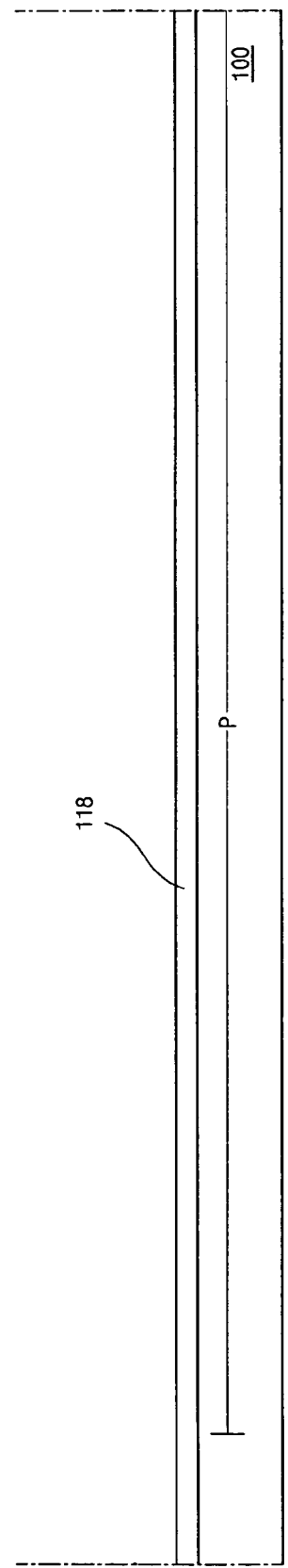

As shown in FIGS. 7A and 7B, a pixel region P including a switching region S is defined on a substrate 100. A conductive metallic material is deposited on the substrate 100 where the switching region S and the pixel region P are defined and then patterned to form gate lines 112a and 112b, as shown in FIG. 4, and a gate electrode 114. A gate line 112a extends along a first direction, and the gate electrode 114 is connected to the gate line 112a. At the same time, a common line 116, as shown in FIG. 4, is formed across the pixel region P. The common line 116 includes a plate A at the center of the pixel region P. The conductive metallic material may include at least one of aluminum (Al), an aluminum alloy (AlNd), chromium (Cr), copper (Cu), titanium (Ti), and molybdenum (Mo).

Next, a gate insulating layer 118 is formed over substantially an entire surface of the substrate 100 on which the gate lines 112a and 112b, the common line 116, and the gate electrode 114 are formed. The gate insulating layer 118 can be formed by depositing an inorganic insulating material, such as silicon nitride ($SiN_x$) or silicon oxide ($SiO_2$).

Intrinsic amorphous silicon (a-Si:H) and impurity-doped amorphous silicon (n+a-Si:H) are sequentially deposited on a substantially entire surface of the substrate 100 having the gate insulating layer 118 thereon and then patterned to thereby form an active layer 120 and an ohmic contact layer 122 on the gate insulating layer 118 corresponding to the gate electrode 114.

Figure 8A:
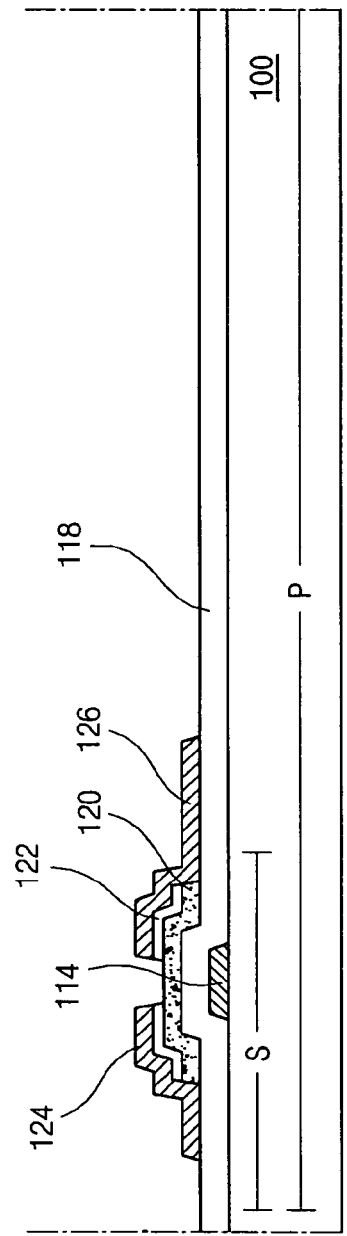
Figure 8B:
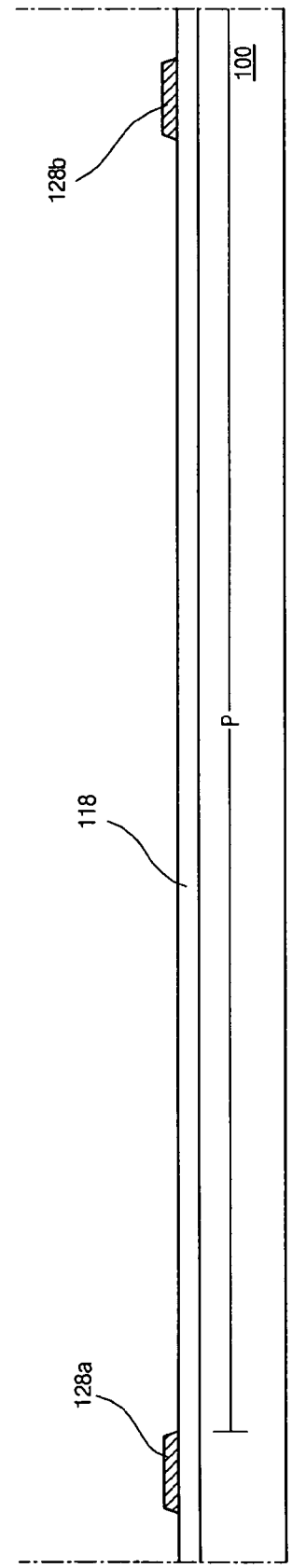

As shown in FIGS. 8A and 8B, one or more materials selected from the conductive metal group stated above are deposited on a substantially entire surface of the substrate 100 including the active layer 120 and the ohmic contact layer 122 and then patterned to form a source electrode 124 and a drain electrode 126 on the ohmic contact layer 122. The source and drain electrodes 124 and 126 are spaced apart from each other. Simultaneously, data lines 128a and 128b are formed at sides of the pixel region P, as shown in FIG. 8B. The data line 128a is connected to the source electrode 124 and crosses the gate line 112a of FIG. 4 to define the pixel region P.

Figure 9A:
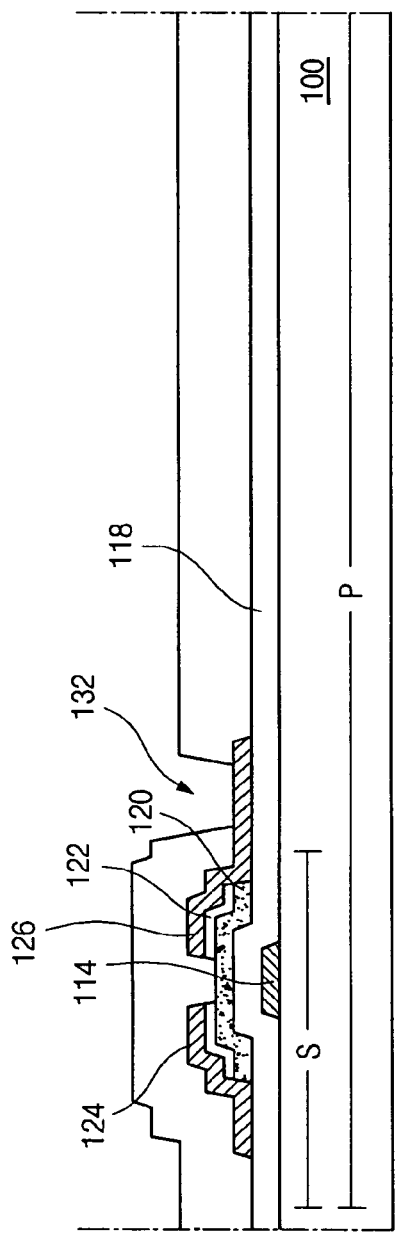
Figure 9B:
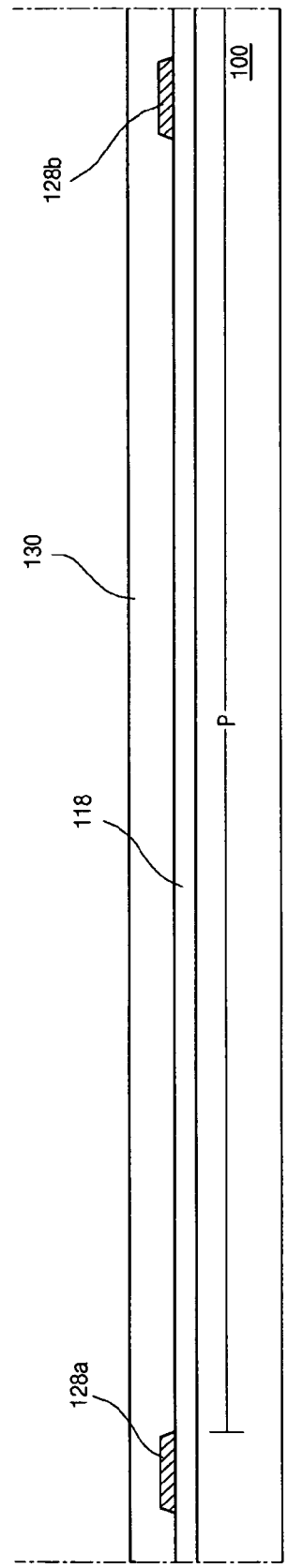

As shown in FIGS. 9A and 9B, a passivation layer 130 is formed on substantially an entire surface of the substrate 100 including the source and drain electrodes 124 and 126 thereon by coating one or more materials selected from an organic insulating material group including benzocyclobutene (BCB) and acrylic resin. Then, the passivation layer is patterned to thereby form a drain contact hole 132 exposing a drain electrode 126.

Figure 10A:
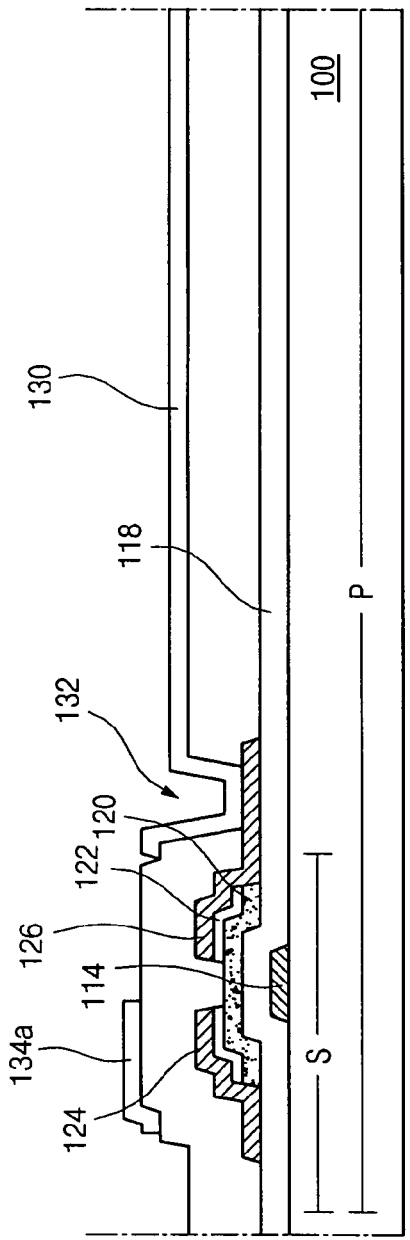
Figure 10B:
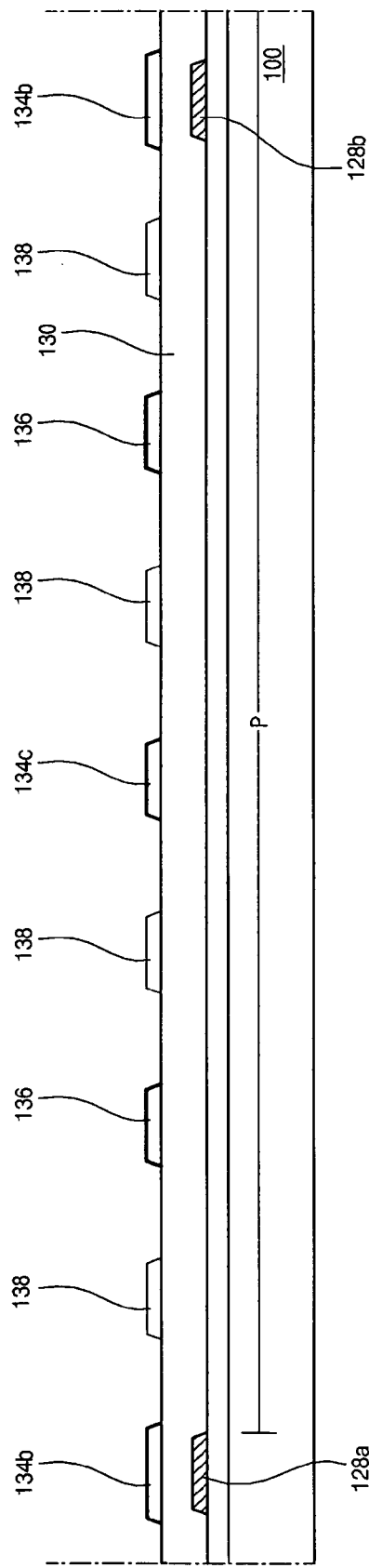

In FIGS. 10A and 10B, a transparent conductive material is deposited over substantially an entire surface of the substrate 100 including the passivation layer thereon and then patterned to form a common electrode and a pixel electrode 136 in the pixel region P. The common electrode includes a first horizontal part 134a, first vertical parts 134b, and a second vertical part 134c, a third vertical part 134d of FIG. 4, and a second horizontal part 134e of FIG. 4. The first horizontal part 134a overlaps the gate line 112a, and the first vertical parts 134b overlap the data lines 128a and 128b. The first and second vertical parts 134b and 134c are spaced apart from each other. The pixel electrode 136 includes a plate B, as shown in FIG. 4, and two vertical portions. Vertical portions of the pixel electrode 136 are disposed between the first vertical parts 134b, and the second and third vertical parts 134c and 134d.

At the same time the common and pixel electrodes are formed, conductive patterns 138 are formed on the passivation layer 130. Each of the conductive patterns 138 is disposed between adjacent common and pixel electrodes. That is, the conductive patterns 138 are disposed between the first vertical parts 134b and the vertical portion of the pixel electrode 136, and between the vertical portion of the pixel electrode 136 and the second vertical part 134c, respectively. Although not shown, one of the conductive patterns 138 is disposed between the vertical portion of the pixel electrode 136 and the third vertical part 134d. The common electrode, the pixel electrode 136 and the conductive patterns 138 are formed of a transparent conductive material, such as indium tin oxide (ITO) or indium zinc oxide (IZO).

In embodiments of the present invention, a conductive pattern is formed between adjacent common and pixel electrodes, and a density of an electric field between the common and pixel electrodes is increased. Therefore, the electric field intensity along both sides of each of the common and pixel electrodes is increased over the tops of each of the common and pixel electrodes. Due to the increased electric field over the tops of the common and pixel electrodes, liquid crystal molecules over the tops of each of the common and pixel electrodes are driven by the electric field. Accordingly, the transmittance is improved, and the brightness is increased.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An array substrate for an in-plane switching liquid crystal display device, comprising:
   a substrate;
   a gate line and a data line on the substrate and crossing each other to define a pixel region;
   a thin film transistor adjacent to a crossing of the gate line and the data line;
   a common electrode and a pixel electrode in the pixel region and spaced apart from each other along a direction parallel to the substrate; and
   a conductive pattern between the common and pixel electrodes, wherein the conductive pattern is spaced from the common and pixel electrodes along the direction parallel to the substrate, wherein the data line, the common electrode, the pixel electrode, and the conductive pattern form a V-shape.

2. The device according to claim 1, wherein the common electrode includes a first horizontal part, first vertical parts and a second vertical part, the first horizontal part overlapping the gate line, the first vertical parts extending from the first horizontal part and overlapping the data lines, and the second vertical part extending from the first horizontal part and disposed between adjacent first vertical parts.

3. The device according to claim 2, wherein the common electrode includes a second horizontal part and a third vertical part, the second horizontal part is parallel to the first horizontal part and connected to the first vertical parts, and the third vertical part extending from the second horizontal part and disposed between adjacent first vertical parts.

4. The device according to claim 1, wherein the common electrode, the pixel electrode, and the conductive pattern are formed of a transparent conductive material.

5. The device according to claim 1, wherein the conductive pattern is electrically isolated from the common electrode and from the pixel electrode.

6. An array substrate for an in-plane switching liquid crystal display device, comprising:
   a substrate;
   a gate line and a data line on the substrate and crossing each other to define a pixel region;
   a thin film transistor adjacent to a crossing of the gate line and the data line;
   a common electrode and a pixel electrode in the pixel region and spaced apart from each other;
   a conductive pattern between the common and pixel electrodes; and
   a common line parallel to the gate line, the common line having a first plate substantially at a center of the pixel region, the first plate having a width wider than the common line.

7. The device according to claim 6, wherein the pixel electrode includes a second plate, which overlaps the first plate of the common line and an insulating layer to form a storage capacitor.

8. A manufacturing method of an array substrate for an in-plane switching liquid crystal display device, comprising:
   forming a gate line and a data line on a substrate, the gate line and the data line crossing each other to define a pixel region;
   forming a thin film transistor adjacent to a crossing of the gate line and the data line;
   forming a common electrode and a pixel electrode in the pixel region, the common and pixel electrodes spaced apart from each other; and
   forming a conductive pattern between the common and pixel electrodes; and
   forming a common line parallel to the gate line, the common line having a first plate at substantially a center of the pixel region.

9. The method according to claim 8, wherein the pixel electrode includes a second plate, which overlaps the first plate of the common line and an insulating film to form a storage capacitor.

10. An array substrate for an in-plane switching liquid crystal display device, comprising:
    a substrate;
    a gate line and a data line on the substrate and crossing each other to define a pixel region;
    a thin film transistor adjacent to a crossing of the gate line and the data line;
    a common line having a first plate at substantially a center of the pixel region;
    a pixel electrode having a second plate, which overlaps the first plate of the common line and an insulating film to form a storage capacitor, at least first and second pixel electrode portions extending from the second plate of the pixel electrode;
    vertical parts connected to the common line and overlapping data lines on both sides of the pixel region;
    a first conductive pattern between the first pixel electrode portion and one of the vertical parts; and
    a second conductive pattern between the second pixel electrode portion and another of the vertical parts.

11. The device according to claim 10, wherein the first and second pixel electrode portions, and the first and second conductive patterns are formed of a transparent conductive material.

12. The device according to claim 10, wherein the vertical parts, the first and second pixel electrode portions, and the first and second conductive patterns form a V-shape.

13. The device according to claim 10, wherein the first and second conductive patterns are electrically isolated from the common line and from the pixel electrode.

14. A manufacturing method of an array substrate for an in-plane switching liquid crystal display device, comprising:
    forming a gate line and a data line on a substrate, the gate line and the data line crossing each other to define a pixel region;
    forming a thin film transistor adjacent to a crossing of the gate line and the data line;
    forming a common electrode and a pixel electrode in the pixel region, the common and pixel electrodes spaced apart from each other along a direction parallel to the substrate; and
    forming a conductive pattern between the common and pixel electrodes, wherein the conductive pattern is spaced from the common and pixel electrodes along the direction parallel to the substrate,
    wherein the data line, the common electrode, the pixel electrode, and the conductive pattern form a V-shape.

15. The method according to claim 14, wherein the common electrode includes a first horizontal part, first vertical parts, and a second vertical part, the first horizontal part overlapping the gate line, the first vertical parts extending from the first horizontal part and overlapping the data lines, and the second vertical part extending from the first horizontal part and disposed between adjacent first vertical parts.

16. The method according to claim 15, wherein the common electrode includes a second horizontal part and a third vertical part, the second horizontal part parallel to the first horizontal part and connected to the first vertical parts, and the third vertical part extending from the second horizontal part and disposed between adjacent first vertical parts.

17. The method according to claim 14, wherein the common electrode, the pixel electrode, and the conductive pattern are formed of a transparent conductive material.

18. The method according to claim 17, wherein the transparent conductive material is one of indium tin oxide (ITO) and indium zinc oxide (IZO).

19. The method according to claim 14, wherein the conductive pattern is electrically isolated from the common electrode and from the pixel electrode.

* * * * *